United States Patent
Ueyama et al.

(10) Patent No.: US 6,699,549 B1
(45) Date of Patent: Mar. 2, 2004

(54) HEAT-SHRINKABLE MULTILAYER FILM

(75) Inventors: Takahisa Ueyama, Ibaraki-ken (JP); Tadayoshi Itoh, Ibaraki-ken (JP); Eiichi Hayashi, Ibaraki-ken (JP); Hajime Tsukamoto, Ibaraki-ken (JP)

(73) Assignee: Kureha Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/673,956

(22) PCT Filed: Apr. 22, 1999

(86) PCT No.: PCT/JP99/02150
§ 371 (c)(1),
(2), (4) Date: Oct. 24, 2000

(87) PCT Pub. No.: WO99/55528
PCT Pub. Date: Nov. 4, 1999

(30) Foreign Application Priority Data

Apr. 24, 1998 (JP) .............................. 10-129758

(51) Int. Cl.[7] .............................. B32B 27/08
(52) U.S. Cl. ............... 428/36.7; 264/514; 264/562; 264/563; 428/349; 428/475.2; 428/475.8
(58) Field of Search ............... 428/36.7, 349, 428/475.2, 475.8; 264/514, 562, 563

(56) References Cited

U.S. PATENT DOCUMENTS

| | | | |
|---|---|---|---|
| 4,188,443 A | 2/1980 | Mueller et al. | 428/216 |
| 6,146,726 A * | 11/2000 | Yoshii et al. | 428/34.9 |

FOREIGN PATENT DOCUMENTS

| | | |
|---|---|---|
| EP | 0 476 836 | 3/1992 |
| JP | 59024628 A * | 2/1984 |
| JP | 03104623 A * | 5/1991 |

OTHER PUBLICATIONS

Patent Abstracts of Japan, vol. 015, No. 124, Mar. 26, 1991 & JP 03 013336 A, Jan. 22, 1991 *abstract*.

* cited by examiner

Primary Examiner—Sandra M. Nolan
(74) Attorney, Agent, or Firm—Wenderoth, Lind & Ponack, L.L.P.

(57) ABSTRACT

A polyester-surfaced heat-shrinkable multilayer film exhibiting good printability and adaptability to various automatic packaging processes is provided, including an outer surface layer (a) comprising a polyester resin, an intermediate layer (b) comprising a polyamide resin and an inner surface layer (c) comprising a sealable resin. The film exhibits a heat-shrinkable stress at 50° C. of at most 3 MPa both in longitudinal direction and in transverse direction, and a hot water shrinkability at 90° C. of at least 20%.

27 Claims, 1 Drawing Sheet

HEAT-SHRINKABLE MULTILAYER FILM

This a 371 application of PCT/JP99/02150 filed Apr. 22, 1999.

TECHNICAL FIELD

The present invention relates to a heat-shrinkable multilayer film suitable for use as a heat-shrinkable packaging material including an outer surface layer comprising a polyester resin, an intermediate layer comprising a polyamide resin and a sealable resin layer, and also a process for production of such a heat-shrinkable multilayer film.

BACKGROUND ART

Hitherto, it has been widely practiced to make a packaging material, such as a bag or a pouch, of a heat-shrinkable resin film by means of a bag-making machine, and fill the packaging material with a content material or subject the packaging material to flow packaging, tray packaging or skin packaging by means of an automatic packaging machine, principally for packaging of ham, sausage and other foods.

Such heat-shrinkable resin films have been conventionally provided in many cases in the form of heat-shrinkable multilayer films including various forms or structures of laminate of various resins inclusive of a polyolefin resin (hereinafter sometimes abbreviated as "PO") excellent in sealability. extrudability and stretchability, a polyamide resin (abbreviated as "PA") excellent in mechanical properties, stretchability and gas-barrier property, a vinylidene chloride resin (abbreviated as "VdCl") or an ethylene-vinyl alcohol copolymer resin (abbreviated as "EVOH") that is particularly excellent in gas-barrier property, an ethylene-vinyl acetate copolymer resin (abbreviated as "EVA") or a modified polyolefin resin (abbreviated as "M-PO") in a sense of including an ionomer resin that is excellent in heat-sealability and adhesiveness, etc. Representative examples of laminate form or structure may include: PO/PA/PO, EVA/PA/EVA, PO/PA/EVA (e.g., as disclosed in Japanese Laid-Open Patent Application (JP-A) 51-92882, JP-A 55-130743, JP-A 8-23035), and further PA/EVA/VdCl/EVA/PA (e.g., as disclosed in JP-A 62-273849) wherein respective layers are enumerated from the outer surface layer to the inner surface layer in each laminate structure.

In case where such a heat-shrinkable multilayer film having a representative laminate structure of PO/PA/PO, EVA/PA/EVA or PO/PA/EVA is subjected to heat-sealing by means of a sealing bar included in a representative automatic packaging mode, the PO or EVA layer constituting the inner surface layer shows good sealability but the outer surface layer of PO or EVA is also liable to adhere to the seal bar due to heat fusion, so that it is difficult to increase the heat-sealing speed, and accordingly the automatic packing speed. Further, a film having such a laminate structure is also generally liable to be insufficient in transparency. Further, a film having an outer surface layer of PO is liable to exhibit insufficient printability. Most of such difficulties are not encountered in a heat-shrinkable multilayer film having a laminate structure of PA/EVA/VdCl/EVA/PA, but this film is accompanied with a difficulty that its film properties are liable to be changed depending on changes in environmental conditions because the surface layers of PA are rich in moisture-absorptivity.

In order to solve many of the problems accompanying the laminate structures of conventional heat-shrinkable multilayer films, our research and development group has proposed a heat-shrinkable multilayer film including a relatively thin outer surface layer of a polyester resin (hereinafter sometimes, representatively abbreviated as "PET") which had not used hitherto for laminate film formation by co-extrusion and stretching with a polyamide resin, and an intermediate layer of polyamide resin, realized by harmonizing the stretchability of the outer surface layer of PET with that of the intermediate layer of PA (JP-A 4-99621. corresponding to U.S. Pat. No. 5336549 and EP-A 476836). Representative example laminate structures of the heat-shrinkable multilayer film disclosed therein include; PET/PA/PO, PET/M-PO/PA/M-PO/PO and PET/M-PO/PA/EVOH/M-PO/PO. In the heat-shrinkable multilayer film, the outer surface layer of exhibits essentially larger heat resistance and better printability than that of PO as a typical sealable resin, and also better anti-moisture stability than that of PA. Further, as the co-stretchability of the outer surface layer of PET and the intermediate layer of PA has been harmonized, the resultant film after biaxial stretching exhibits a relatively good size stability without applying a heat-treatment which causes a lowering in heat-shrinkability, thus providing a heat-shrinkable multilayer film exhibiting excellent performances as a heat-shrinkable packaging material.

As a result of further study of ours, it has been however found that the above-mentioned PET-surfaced heat-shrinkable multilayer film causes several problems because of its inherent heat-shrinkability when applied to automatic packaging. The problems are, e.g., as follows. (a) In case of tray packaging wherein a processed meat product is placed on a foamed plastic tray and then wrapped with a heat-shrinkable film, followed by heat-shrinking of the film to provide a packaged product with the film intimately attached to the content, the tray in the packaged product is deformed. (b) In case of pizza packaging wherein a pizza is wrapped with a heat-shrinkable film in the form of sealing at three sides, followed by heat-shrinking to provide a packaged product, the pizza is bent to lower the merchandise value. (c) When a deep-drawn container or tray containing a content therein is covered with a heat-shrinkable film as a lidding material, followed by shrinking of the film to provide a packaged product, the container or tray is deformed. (d) When an angular product (such as ham) is wrapped with a heat-shrinkable film and subjected to a boiling treatment (e.g., at 90° C. for 10 min.) for both heat-shrinking and sterilization, the angles of the product are rounded to lower the merchandise value. (e) In case of automatic packaging including heat-sealing by means of a sealing bar, a sealing failure occurs in some cases if the sealing speed is increased. Particularly, pinhole defects occur in some cases due to double sealing in case where the sealing interval is reduced. (f) Irregular shrinkage of the film occurs during printing in some cases, whereby the resultant printed film is accompanied with print deviation or non-flat rolled state, thus resulting in difficulties in bag-making and packaging thereafter.

DISCLOSURE OF INVENTION

Accordingly, a principal object of the present invention is to provide a PET-surfaced heat-shrinkable multilayer film adapted to automatic packaging.

As a result of our further study for accomplishing the above object, it has been found that most of the above-mentioned problems (a)–(f) accompanying the known PET-surfaced heat-shrinkable multilayer film are attributable to its inherent heat-shrinkability but, more than the degree or magnitude of the heat-shrinkability, are attributable to an excessively large stress occurring in the film during the heat-shrinkage, i.e., an excessively large heat-shrinkage stress. It has been also discovered that, while a heat-treatment or annealing is conventionally applied to a PET (polyester resin) film as a post-treatment after biaxial stretching for removing the heat-shrinkability to provide a size stability, a PET-surfaced multilayer film laminated with a PA layer after biaxial stretching under appropriate conditions may be subjected to an optimum heat-treatment (i.e., a heat-treatment capable of exerting a relaxation at a relatively low temperature) to effectively reduce the heat-shrinkage stress while retaining a necessary level of heat-shrinkability, thus solving most of the above-mentioned problems encountered in automatic packaging. It has been also found that in order to effect such a heat-treatment exerting a uniform relaxation effect at a low temperature after an inflation process as a preferable biaxial stretching process, it is extremely preferred to use steam or warm water having a large heat capacity as the heat-treatment medium.

The heat-shrinkable multilayer film according to the present invention is based on the above findings and more specifically comprises at least three layers including an outer surface layer (a) comprising a polyester resin, an intermediate layer (b) comprising a polyamide resin and an inner surface layer (c) comprising a sealable resin; said multilayer film exhibiting a heat-shrinkage stress at 50° C. of at most 3 MPa both in longitudinal direction and transverse direction, and a hot water shrinkability at 90° C. of at least 20%.

According to the present invention, there is also provided a process for producing a heat-shrinkable multilayer film, comprising the steps of:

co-extruding at least three species of melted thermoplastic resins to form a tubular product comprising at least three layers including an outer surface layer (a) comprising a polyester resin, an intermediate layer (b) comprising a polyamide resin and an inner surface layer (c) comprising a sealable resin, cooling with water the tubular product to a temperature below a lowest one of the melting points of the polyester resin, the polyamide resin and the sealable resin constituting the layers (a), (b) and (c), re-heating the tubular product to a temperature which is at most the lowest one of the melting points of the polyester resin, the polyamide resin and the sealable resin constituting the layers (a), (b) and (c), vertically pulling the tubular product while introducing a fluid into the tubular product to stretch the tubular product at a ratio of 2.5–4 times both in a vertical direction and in a circumferential direction, thereby providing a biaxially stretched tubular film, folding the tubular film, again introducing a fluid into the folded tubular film to form a tubular film, heat-treating the tubular film from its outer surface layer (a) with steam or warm water at 60–98° C., and cooling the heat-treated tubular film to provide a biaxially stretched film exhibiting a heat-shrinkage stress at 50° C. of at most 3 MPa both in longitudinal direction and transverse direction, and a hot water shrinkable at 90° C. of at least 20%.

DETAILED DESCRIPTION OF THE INVENTION

Figure 1:
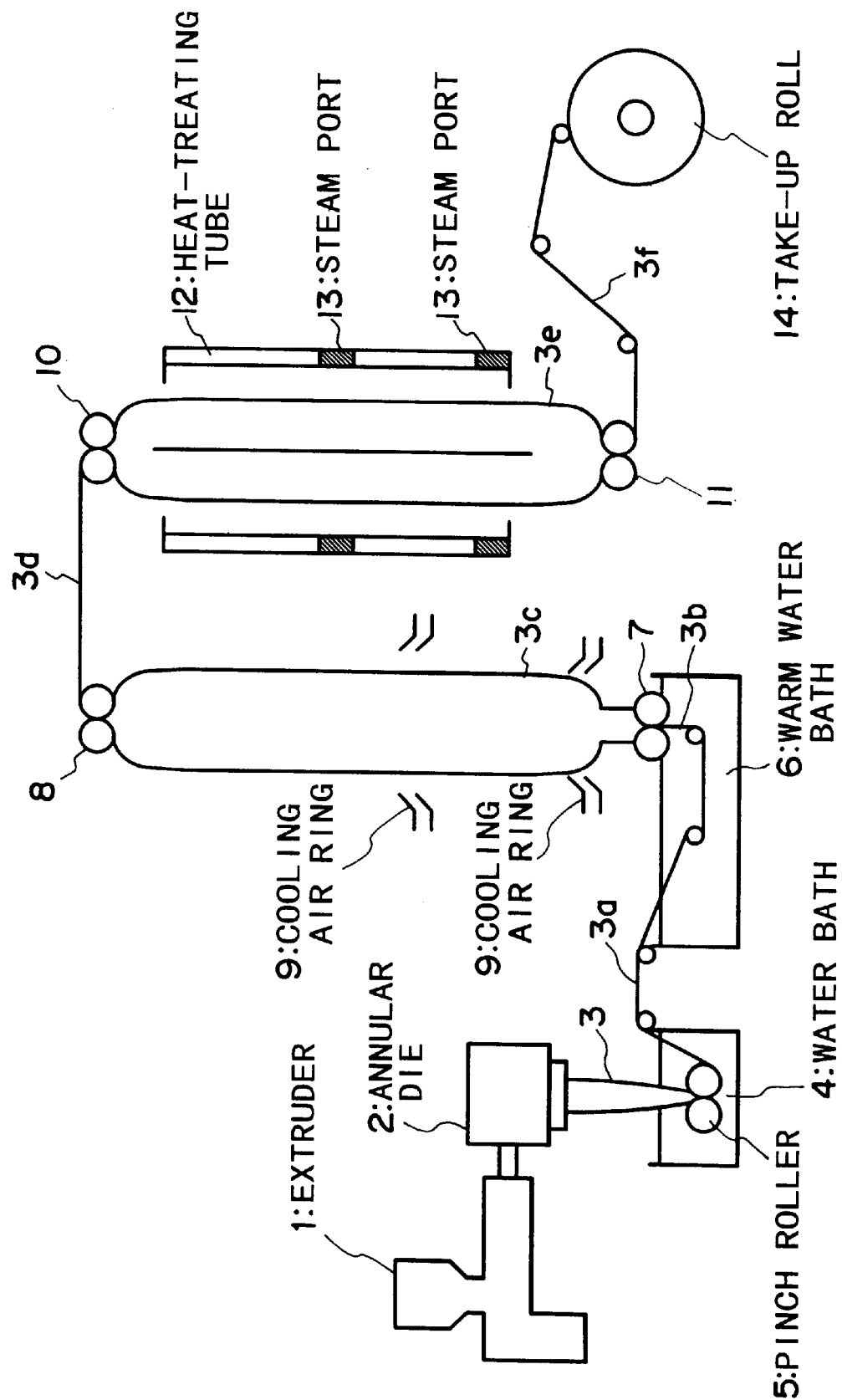
FIG. 1, the sole FIGURE in the drawing, is a schematic illustration of an apparatus system suitable for practicing an embodiment of the process for producing a heat-shrinkable multilayer film according to the invention.

The heat-shrinkable multilayer film according to the present invention comprises at least three layers including an outer surface layer (a) comprising a polyester resin, an intermediate layer (b) comprising a polyamide resin and an inner surface layer (c) comprising a sealable resin.

The polyester resin (PET) constituting the outer surface layer (a) may comprise either an aliphatic polyester resin or an aromatic polyester resin.

More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexane-dicarboxylic acid, adipic acid, oxalic acid, malonic acid, succinic acid, agelaic acid, sebacic acid, and dimer acids comprising dimers of unsaturated fatty acids. These acids may be used singly or in combination of two or more species. Examples of diols constituting the polyester resin may include: ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol. These diols may be used singly or in combination of two or more species.

Among these, it is preferred to use an aromatic polyester resin including an aromatic dicarboxylic acid component, particularly preferably a polyester formed from terephthalic acid as the dicarboxylic acid and a diol having at most 10 carbon atoms, such as polyethylene terephthalate or polybutylene terephthalate. It is also preferred to use a co-polyester resin formed by replacing a portion, preferably at most 30 mol. %, more preferably at most 15 mol. %, of the terephthalic acid with another dicarboxylic acid, such as isophthalic acid, or a copolyester resin between terephthalic acid and a mixture of diols, such as ethylene glycol and 1,4-cyclohexanediol (e.g., "Kadapack PET#9921", available from Eastoman Kodak Co.).

The polyester resin may preferably be one having an intrinsic viscosity of ca. 0.6–1.2. The outer surface layer (a) can contain up to 20 wt. % of a thermoplastic resin other than the polyester resin, such as a thermoplastic elastomer as represented by thermoplastic polyurethane, or a polyolefin resin modified with an acid, such as maleic acid, or an anhydride thereof.

Examples of the polyamide resin (PA) constituting the intermediate layer (b) may include: aliphatic polyamides, such as nylon 6, nylon 66, nylon 11, nylon 12, nylon 69, nylon 610 and nylon 612; and aliphatic co-polyamides, such as nylon 6/66, nylon 6/69, nylon 6/610, nylon 66/610, and nylon 6/12. Among these, nylon 6/66 and nylon 6/12 are particularly preferred in view of moldability and processability. These aliphatic (co-)polyamides may be used singly or in mixture of two or more species. It is also possible to use a blend of such an aliphatic (co-)polyamide with a minor amount of an aromatic polyamide. Herein, the aromatic polyamide means a polycondensation product between a diamine and a dicarboxylic acid, at least one of which contains at least partially an aromatic unit. An aromatic co-polyamide is preferred. Examples thereof may include: a copolymer of an aliphatic nylon and an aromatic polyamide including an aromatic diamine unit, such as nylon 66/610/MXD6 (wherein "MXD6" represents polymetaxylylene adipamide), and a copolymer of an aliphatic nylon and an aromatic polyamide including an aromatic carboxylic acid unit, such as nylon 66/69/6I, nylon 6/6I and nylon 6I/6T (wherein "(nylon) 6I" represents polyhexamethylene isophthalamide, and "(nylon) 6T" represents polyhexamethylene terephthalamide). These polyamide resins may be used singly or in mixture so as to provide a melting point of preferably 160–210° C. The intermediate layer (b) can contain up to ca. 30 wt. % of a thermoplastic resin other than the polyamide resin, such as a polyolefin resin modified with an acid, such as maleic acid, or an anhydride thereof, ethylene-acrylic acid copolymer, ethylene-methacrylic acid copolymer, ionomer resin, or (partially) saponified ethylene-vinyl acetate copolymer.

The sealable resin constituting the inner surface layer (c) may be appropriately selected from thermoplastic resins inclusive of: polyolefins polymerized by using a single-site catalyst or metallocene catalyst (sometimes abbreviated as "SSC") inclusive of linear low-density polyethylene (abbreviated as "SSC-LLDPE") and very low-density polyethylene (abbreviated as "SSC-VLDPE"); conventional types of ethylene-α-olefin copolymers inclusive of "LLDPE" and "VLDPE" in terms of generally accepted abbreviations; ethylene-vinyl acetate copolymer (abbreviated as "EVA"), ethylene-methacrylic acid copolymer (abbreviated as "EMAA"), ethylene-methacrylic acid-unsaturated aliphatic carboxylic acid copolymer, low-density polyethylene, ionomer resin (abbreviated as "IO (resin)"), ethylene-acrylic acid copolymer, ethylene-methyl acrylate copolymer (abbreviated as "EMA"), and ethylene-butyl acrylate copolymer (abbreviated "EBA"). Such a preferred class of sealable resins may be termed as an ethylene copolymer, typically a copolymer of a major amount (i.e., more than 50 wt. %) of ethylene with a minor amount (i.e., less than 50 wt. %, preferably up to 30 wt. %) of a vinyl monomer copolymerizable with ethylene selected from the group consisting of α-olefins having 3 to 8 carbon atoms, and unsaturated carboxylic acids and unsaturated esters of carboxylic acids having up to 8 carbon atoms, inclusive of acrylic acid, methacrylic acid, acrylate esters, methacrylate esters and vinyl acetate, or an acid-modified product of the ethylene copolymer (preferably modified with up to 3 wt. % of an unsaturated carboxylic acid). It is also possible to use a thermoplastic resin, such as thermoplastic resin, such as polypropylene resin, polyester resin or aliphatic nylon. The sealable resin may preferably have a melting point of at most 150° C., more preferably at most 135° C. It is also possible to use a blend including at least one species of such a sealable resin within an extent of not impairing the transparency of the resultant film or a sealed product thereof.

Among the above, preferred examples of such sealable resins constituting the inner surface layer (c) may include: SSC-LLDPE, SSC-VLDPE, LLDPE, VLDPE, EVA, EMAA, ethylene-methacrylic acid-unsaturated aliphatic carboxylic acid copolymer, and IO resins. A particularly preferred class of SSC-type polyolefins may include those obtained by using a constrained geometry catalyst (a type of metallocene catalyst developed by Dow Chemical Company). The constrained geometry catalyst may provide ethylene-α-olefin copolymers which may be classified as a substantially linear polyethylene resin having ca. 0.01–ca. 3, preferably ca. 0.01–ca. 1, more preferably ca. 0.05–ca. 1, long-chain branching(s) per 1000 carbon atoms. Because of long-chain branches each having ca. 6 or more carbon atoms selectively introduced into its molecular structure, the ethylene-α-olefin copolymer may be provided with excellent physical properties and good formability or processability, and an example thereof is commercially available from Dow Chemical Company under a trade name of "AFFINITY" or "ELITE" (including 1-octane as α-olefin).

Other examples of polyethylene resins obtained by using a metallocene catalyst may include those available from Exxon Co. under a trade name of "EXACT".

Such a metallocene-catalyzed polyolefin (SSC-polyolefin) may preferably have a dispersion factor defined as a ratio (Mw/Mn) between a weight-average molecular weight (Mw) and a number-average molecular weight (Mn) of below 3, more preferably 1.9–2.2.

The heat-shrinkable multilayer film according to the present invention includes the above-mentioned outer surface layer (a) comprising a polyester resin, intermediate layer (b) comprising a polyamide resin, and inner surface layer (c) comprising a sealable resin, as its indispensable component layers, but can also include an additional intermediate layer other than the intermediate layer (b) comprising a polyamide resin for the purpose of, e.g., providing the product multilayer film with improved functionality or processability. Examples of such an optional intermediate layer may include the following.

A gas barrier intermediate layer (d), particularly an oxygen gas-barrier layer, comprising a gas barrier resin, examples of which may include: EVOH (saponified ethylene-vinyl acetate copolymer); aromatic polyamides including an aromatic diamine unit, such as polymethacrylene adipamide (nylon MXD6); and amorphous aromatic polyamides including an aromatic carboxylic acid unit, such as polyhexamethylene isophthalamide/terephthalamide (nylon 6I/6T) which is a copolymer of isophthalic acid, terephthalic acid and hexamethylenediamine.

Another type of preferable intermediate layer may comprise a copolymer of ethylene and at least one species of monomer containing an oxygen atom in its molecule. Specific examples thereof may include: EVA, EMAA, ethylene-methacrylic acid-unsaturated aliphatic carboxylic acid copolymer, EMA, EAA, EBA and IO resin.

Further, a layer of metallocene-catalyzed polyolefin having a density below 0.900 g/cm$^3$ exhibits a good stretch orientation characteristic and may preferably be inserted as an optional intermediate layer for providing a multilayer film having a large heat-shrinkability.

One or more adhesive resin layers may be inserted as an optional intermediate layer, as desired, e.g., in case where a sufficient adhesion is not ensured between the above-mentioned respective layers. Such an adhesive resin can be selected from those constituting the above-mentioned optional intermediate layers. Further preferred examples of the adhesive resin used for the above purpose may include: EVA, EEA, EAA, acid-modified polyolefins (inclusive of reaction products between olefin homo- or co-polymers and unsaturated carboxylic acids, such as maleic acid and fumaric acid, acid anhydrides, esters or metal salts of these acids, such as acid-modified VLDPE, acid modified LLDPE and acid-modified EVA). It is particularly suitable to use a polyolefin resin modified with an acid such as maleic acid or an anhydride thereof.

Into any one or more of the above-mentioned layers, it is possible to add an additive, such as a lubricant or an antistatic agent.

Examples of the lubricant may include: hydrocarbon lubricants, fatty acid lubricants, fatty acid amide lubricants, ester lubricants and metallic soaps. The lubricants may be liquid or solid. Specific examples of the hydrocarbon lubricants may include: liquid paraffin, natural paraffin, polyethylene wax and micro-crystalline wax. Fatty acid lubricants may include stearic acid and lauric acid. Fatty acid amide lubricants may include: stearic acid amide, palmitic acid amide, palmitic acid amide, N-oleyl-palmitic acid amide, erucic acid amide, arachidic acid amide, oleic acid amide, methylene-bis-stearoyl amide, and ethylene-bis-stearoyl amide. Ester lubricants may include butyl stearate, hardened castor oil, ethylene glycol monostearate, and stearic acid mono-glyceride. Metallic soaps may be derived from fatty acids having 12–30 carbon atoms and may include zinc stearate and calcium stearate as representative examples. Among these, fatty acid amide lubricants and calcium metallic soaps may be preferred because of good compatibility with a thermoplastic resin, particularly a polyolefinic resin. Specifically preferred examples of lubricants may include behenic acid amide, oleic acid amide and erucic acid amide. These lubricants may preferably be added in the form of a master batch. Such a master batch containing, e.g., 5–20 wt. % of a lubricant, may preferably be added in an amount sufficient to provide a concentration of 0.05–2 wt. % of the lubricant in a resin layer concerned.

The antistatic agent may preferably be a surfactant, which may be any of anionic surfactants, cationic surfactants, nonionic surfactants, amphoteric surfactants and mixtures of these. The anti-static agent may preferably be added in a proportion of 0.05–2 wt. %, more preferably 0.1–1 wt. % of a resin layer to which it is added.

In the above-mentioned layer structure, it is also possible to add an inorganic lubricant (anti-blocking agent) or a anti-fogging agent.

The inorganic lubricant may include known inorganic fillers to be added into film-forming resins for the purpose of preventing sticking of films to each other, such as talc, diatomaceous earth, silica, zeolite, calcium carbonate and aluminosilicate. Spherical fillers may be desired. Among these, silica and aluminosilicate are preferred because of good dispersibility. Such an inorganic lubricant is added in the form of a master batch.

An anti-fogging agent is added in order to prevent the worsening in observability of a content material containing much moisture (such as "meat") due to attachment of water droplets onto an inner surface of a packaging film in the case of tray packaging etc., and a known anti-fogging agent may be used. Such an antifogging agent may be kneaded into a film material or applied onto a surface. The anti-fogging agent is generally added to the inner surface layer but can be added to the outer surface layer so as to be transferred onto the inner surface layer when a tubular film is slit along its pinch portion into a single film and then wound about a roll.

The heat-shrinkable multilayer film may preferably be formed by laminating the above-mentioned layers, followed by stretching into a final form of multilayer film having a total thickness of 3–120 $\mu$m, particularly 10–90 $\mu$m. More specifically, a film subjected to shrinking under dry-heating as in tray packaging, pizza packaging, lid-forming, etc., may preferably have a relatively small thickness of at most 50 $\mu$m, and a film subjected to shrinking under wet-heating as in boiling or hot-water shrinking may preferably have a relatively large thickness of at least 35 $\mu$m.

More specifically, it is preferred that the outer surface layer (a) comprising a polyester resin has a thickness of 0.5–10 $\mu$m, particularly 1–5 $\mu$m, the intermediate layer (b) comprising a polyamide resin has a thickness of 3–50 $\mu$m, particularly 5–30 $\mu$m, and the inner surface layer (c) comprising a sealable resin has a thickness of 8–80 $\mu$m, particularly 10–60 $\mu$m. In order to provide the multilayer film with a properly harmonized biaxial stretchability, it is preferred that the layer (a) has a thickness smaller than that of the layer (b), more specifically a thickness of 3–70%, particularly 6–50%, of that of the layer (b).

The optionally disposed gas barrier layer (d) may have a thickness of, e.g., 1–30 $\mu$m, preferably 2–15 $\mu$m. Below 1 $\mu$m, the oxygen gas barrier-improving effect may be scarce, and above 30 $\mu$m, the extrusion of the layer and the stretching and processing of the multilayer film become difficult.

The adhesive resin layer can be disposed in a plurality of layers, each having a thickness in the range of suitably 0.5–5 $\mu$m.

The heat-shrinkable multilayer film may be formed by first forming a yet-unstretched film by co-extrusion through a plurality of extruders and then biaxially stretching the film by a known process, such as the tenter process. The stretching ratio may preferably be 2.5–4 times in both longitudinal and transverse directions. The thus-formed heat-shrinkable multilayer film can also be laminated with another resin layer according to a known lamination process.

The heat-shrinkable multilayer film may preferably be formed through inflation according to the process of the present invention. A preferred embodiment thereof is described with reference to FIG. 1, the sole figure in the drawing.

A number of extruders 1 (only one being shown) are provided corresponding to the number of laminated resin species, and the respective resins from the extruders are co-extruded through an annular die 2 to form a tubular product (parison) 3 including at least three layers of an outer surface layer (a) comprising a polyester resin, an intermediate layer (b) comprising a polyamide resin and an inner surface layer (c) comprising a sealable resin. The parison 3 is then vertically pulled down into a water bath 4 and taken up by pinch rollers 5 while being cooled down to a temperature that is below the lowest one of the melting points of the principal resins constituting the respective resin layers (i.e., the polyester resin, the polyamide resin and the sealable resin), preferably to 40° C. or below. The thus-taken-up tubular film 3a, while optionally introducing an opening aid such as soybean oil thereinto as desired, is introduced into a bath 6 of warm water at, e.g., 80–95° C., which is at most the lowest one of the meting points of the principal resins constituting the respective layers, and the thus-warmed tubular film 3b is pulled upwards to form a bubble of tubular film 3C with fluid air introduced between pairs of pinch rollers 7 and 8, whereby the tubular film 3C is biaxially stretched simultaneously at a ratio of preferably 2.5–4 times, more preferably 2.8–4 times, in each of vertical or machine direction (MD) and transverse or lateral direction (TD) while cooling the film 3C with cool air at 10–20° C. from a cooling air ring 9. The thus biaxially stretched film 3d is once folded or laid flat and then pulled downwards to again form a bubble of tubular film 3e with fluid air introduced between pairs of pinch rollers 10 and 11. The bubble of tubular film 3e is held within a heat-treating tube 12 wherein steam from blowing ports 13 is blown (or warm water from spraying ports is sprayed) against the tubular film 3e to heat-treat the tubular film 3e after the biaxial stretching at 60–98° C., preferably 60–80° C., for ca. 1–20 sec., preferably ca. 1.5–10 sec., thereby allowing the tubular film to relax by 2–25%, preferably 5–15%, in each of the vertical direction (MD) and the transverse direction (TD). A tubular film 3e after the heat-treatment corresponds to a heat-shrinkable multilayer film according to the present invention and is wound about a take-up roller 14.

The thus-obtained heat-shrinkable multilayer film according to the present invention is provided with a reduced heat-shrinkage at 50° C. of at most 3 MPa, preferably at most 2.5 MPa in each of the machine direction(MD) and the transverse direction (TD), while retaining an adequate level of hot-water shrinkability at 90° C. of at least 20%, preferably at least 25%, further preferably at least 30%, in at least one direction, preferably in each of the MD and TD directions, thus being provided with good automatic packaging performances.

A film having a hot water shrinkability at 90° C. of at least 20%, preferably at least 25%, particularly preferably at least 30%, can tightly fit almost all types of content materials to provide beautifully packaged products. Such levels of hot water shrinkability correspond to a dry heat-shrinkability at 120° C. of at least 15%, particularly 20% or higher, thus exhibiting an effect of beautifully packaging content materials in an automatic packaging process including a dry heat-shrink packaging step.

Further, because of a moderately reduced heat-shrinkage stress of at most 3 MPa, preferably 2.5 MPa or lower, the heat-shrinkable multilayer film according to the present invention exhibits excellent adaptability to or matching with a packaging machine and excellent heat-sealability, can effectively prevent the deformation of contents and contains, such as a tray and a deep-drawn container, thus allowing high-speed production of automatically packaged products having extremely good appearance. Further to say, a maximum heat-shrinkage stress at the temperature of actual heat-shrinking for packaging should preferably be at most 4 MPa, more preferably at most 3.5 MPa.

In order to realize such a low heat-shrinkage stress while retaining a sufficiently high hot-water shrinkability, it is particularly preferred to secure a relatively high stretching ratio of 2.5–4 times, particularly 2.8–4 times, in each of the MD/TD directions, and then effect a low-temperature heat treatment at 60–98° C., particularly 60–80° C., with steam or warm water having a large heat capacity. At a lower stretching ratio, it becomes difficult to ensure a necessary level of heat-shrinkability after the heat-treatment, and the product film is caused to have a large local thickness fluctuation, thus being liable to exhibit adequate matching with an automatic packaging machine. On the other hand, in case where a medium having a small heat capacity such as heated air is used or a lower temperature of heated air is used or a lower temperature of below 60° C. is adopted in the heat-treatment after the biaxial stretching, it becomes difficult to attain an objective effect of sufficiently reducing the heat-shrinkage stress.

In the above-described heat-shrinkable multilayer film production process according to the present invention, the multilayer film before or after the stretching may be exposed to actinic radiation. By the exposure to actinic radiation, the product multilayer film may be provided with improved heat resistance and mechanical strength. Because of a moderate crosslinking effect thereof, the exposure to actinic radiation can exhibit an effect of providing improved film formability by stretching and improved heat resistance. In the present invention, known actinic radiation, such as α rays, β rays, electron rays, γ rays, or X rays may be used. In order to provide an adequate level of crosslinking effect, electron rays and γ rays are preferred, and electron rays are particularly preferred in view of facility of handling and high processing capacity in producing the objective multilayer film.

The conditions for the above exposure to actinic radiation may be appropriately set depending on the purpose thereof, such as a required level of crosslinkage. For example, it is preferred to effect the electron ray exposure at an acceleration voltage in the range of 150–500 kilo-volts to provide an absorbed dose of 10–200 kGy (kilo-gray) or effect γ-ray exposure at a dose rate of 0.05–3 kGy/hour to provide an absorbed dose of 10–200 kGy.

By the exposure to actinic radiation, such as electron rays, it is also possible to provide improved meat adhesion, i.e., adhesion with processed meat product, such as ham and sausage, of the inner surface layer (c), thereby preventing the generation of stagnant juice between the film and the contents, improving the appearance of the packaged product and maintaining the quality of the contents.

For similar purpose, it is also possible to expose the inner surface layer (c) to corona discharge. The corona discharge treatment may be effected by using a corona discharger equipped with a high-frequency power supply comprising a high-frequency oscillator and a high-voltage transformer, applying a film onto a silicone-coated treating roller, and expose the film to corona discharge by application of an AC power of at most 4 kW with a voltage of at most 18 kilo-volts and a frequency of 5–120 kHz in an alternative waveform, preferably a sinusoidal wave, between the discharge electrode and the treating roller, thereby providing the treated film surface with a reduced surface tension of at most 36 dyne/cm$^2$, more preferably at most 34 dyne/cm$^2$.

EXAMPLES

Hereinbelow, the present invention will be described more specifically based on Examples and Comparative Examples. It should be noted however that the scope of the present invention is not restricted by such Examples. Some physical properties described herein are based on values measured according to the following methods.

<Physical Property Measurement Methods>

1. Hot-water Shrinkability

A sample film on which marks are indicated at a distance therebetween of 10 cm in each of a machine direction (MD) and a transverse direction (TD) perpendicular to the machine direction, is dipped for 10 sec. in hot water adjusted at 90° C. and then taken out therefrom, followed by immediate quenching within water at room temperature. Thereafter, the distance between the marks is measured and a decrease in distance is indicated in percentage of the original distance 10 cm. Five sample films from each product film are subjected to the above measurement, and the average value of percentage decrease is indicated in each of the MD and TD directions.

2. Dry Heat-shrinkability

A 3 mm-thick corrugated board is placed on a rack, and a Geer oven "Model MOG-600", available from K. K. Robert) is placed thereon and heated to a prescribed temperature. Into the oven, a sample film on which marks are indicated at a distance therebetween of 10 cm in each of MD and TD directions is placed. In this instance, the door of the oven is immediately closed after the placement of the sample film so that the door opening period is restricted to be within 3 minutes. After the door closure, the sample film is left standing for 30 sec in the Geer oven and then taken out for natural cooling. Thereafter, the distance between the marks on the sample film is measured, and a decrease in distance is indicated in percentage of the original distance 10 cm. Five sample films from each product film are subjected to the above measurement, and the average value of percentage decrease is indicated in each of the MD and TD directions.

3. Heat-shrinkage Stress

A sample film strip of 150 mm in length and 15 mm in width taken in its MD and TD directions, respectively, is cut out from a product multilayer film, and set with a gripper span of 100 mm on a universal tester "Model 5565", available from Instron Co.) disposed in a thermostat vessel "3119 Series", available from Instron Co.) held at 23° C., followed by a temperature increase at a rate of 2° C./min. in the thermostat vessel. In the following Examples and Comparative Examples, thermal-shrinkage stress values varying on temperature increase and measured at 40° C. and 50° C. in the course of the temperature increase are indicated.

<Film Production Examples>

Next, Examples and Comparative Examples for production of heat-shrinkable multilayer films are described. Resins used in the following productions examples are inclusively shown in Table 1 together with their abbreviations.

Example 1

By using an apparatus having an arrangement as roughly shown in FIG. 1, a tubular laminate product (parison) having a laminar structure from the outer to the inner layers of PET (2)/M-PE (1.5)/NY-1 (7)/EVOH (5)/M-PE (1.5)/VL-2 (24) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to 10–18° C. by a water bath 4 to form a flat tubular product 3a. Then, the flat tubular product 3a was passed through a warm water bath 6 at 92° C. and formed into a bubble-shaped tubular film 3c, which was then biaxially stretched at ratios of 3.1 times in MD direction and 3.2 times in TD direction by the inflation process while being cooled with cooing air at 15–20° C. from an air ring 9. Then, the biaxially stretched film 3d was guided into a 2 meter-long heat-treating tube 12 to form a bubble-shaped tubular film 3e, which was then heat-treated for 2 sec. with steam at 70° C. blown out of steam blowing ports 13, while being allowed to relax by 5% in MD direction and by 5% in TD direction, thereby providing a biaxially stretched film (heat-shrinkable multilayer film) 3f. The thus-obtained biaxially stretched film exhibited a lay-flat width of 362 mm and a thickness of 41 μm.

The laminate structure and film production (biaxial stretching) conditions, etc. of the thus-obtained biaxially stretched film are inclusively shown in Table 2 together with those of biaxially stretched films obtained in other Examples and Comparative Examples.

Examples 2–21 and Comparative Examples 1–12

Various biaxially stretched films were prepared in similar manners as in Example 1 except that the laminar structures and film production (biaxial stretching) conditions were respectively changed as shown in Table 2 and the relaxation and heat-treating conditions were respectively changed as shown in Table 3.

Each of the biaxially stretched films obtained in the above Examples and Comparative Examples was subjected to the above-mentioned measurement of physical properties and performance evaluation tests described hereinafter. The results are inclusively shown in Tables 3–7 described hereinafter.

<Performance Evaluation Tests>

1. Boiling Test

A sample tubular film obtained in the above-described manner was heat-sealed in two directions, i.e., MD and TD directions, and one pinch portion was cut off, to provide a bag having a length of 350 mm (in TD direction of the film) and a width of 150 mm (in MD direction). Ham in a shape of rectangular parallel-piped as contents was inserted in the bag and vacuum-sealed therein at a room percentage of 15% (i.e., a circumferential length of the bag film being 115% that of the contents), followed by 10 min. of heat sterilization in a hot water bath of 90° C. Then, the appearance of the packaged product was evaluated according to the following standard.

A: The shape of the ham after the heat-sterilization caused substantially no change in shape, and the film tightly fitted on the ham. No breakage of the bag film was observed after the boiling.

B: The corners of the ham after the heat-sterilization were somewhat deformed to lower the merchandise value.

C1: The corners of the ham after the heat-sterilization were lost by round deformation, thus lowering the merchandise value.

C2: Sufficient tight-fitting was not achieved due to insufficient shrinkage, and some wrinkles appeared in the packaging film.

2. Printability

Printing was performed on one surface (on the outer surface side) of a sample film by using a flexographic printer (available from SMB Co.) under the following conditions:

Ink: RESINO INK WHITE (10 kg) containing 15% of hardener.

Rubber plate: Two rubber plates were attached onto a 380 mm-dia. cylinder at pitch of 190 mm.

Heater temperature: 21° C. at station, and 50° C. at bridge.

Running speed: 70 m/min.

The evaluation was performed according to the following standard:

A: The shrinkage after the printing was not substantially observed (<3%), and no printing deviation was observed. The film after the printer could be wrapped into a smooth roll and could be used thereafter for bag making without problem.

B: The shrinkage after the printing was ≧23% and ≦5%, but no printing deviation was observed. The film after printing could be wrapped into a substantially smooth roll an could be used for bag making thereafter.

C: The shrinkage after the printing was as large as above 5%, and printing deviation was caused to result in wrinkles in the film. The film after the printing was wrapped into a roll, which was not however smooth, thus causing a difficulty in bag making thereafter.

3. Skin Packaging Performance

Each sample film was used as a lid film for skin packaging together with a commercially available multilayer film "FA-1", available from Kureha Kagaku K. K.) as a base film. A paper board was placed on a base film and sliced sheets of bacon were placed thereon to be subjected to skin packaging with a sample film heated at 130° C. by a skin packaging machine.

A: The film forming the packaged product exhibited substantially no wrinkles, and no warping was observed even at marginal portion where sliced bacon was not present.

B: The film forming the packaged product exhibited substantially no wrinkles, but a marginal portion where sliced bacon was not present was slightly warped toward the lid film side exhibiting a warped portion height of less than 1 cm from a horizontal base on which the packaged product was placed.

C1: The film forming the packaged product exhibited substantially no wrinkles, but a marginal portion where sliced bacon was not present was remarkably warped toward the lid film side, thus providing an inferior packaged product appearance. The marginal portion exhibited warped height exceeding 1 cm from a horizontal base on which the packaged product was placed.

C2: The film forming the packaged product exhibited wrinkles, thus providing a problematic packaged product appearance as to seriously damage the merchandise value.

4. Flow Packaging Performance

Flow packaging performance was evaluated by using a horizontal flow-packaging machine "NW406", available from Ohmori Kikai K. K.). A sample film was provided as a 380 mm-wide film formed by slitting off fringe portions on both lateral size of a tubular film as obtained in a production example. The sample film was subjected to making of flow packaging bags under the conditions of a center seal temperature of 180° C., a top seal upper portion temperature of 100° C. and a top seal lower portion temperature of 140° C. to provide flow packaging bags of 170 mm in width and 300 mm in length. Into a flow packaging bag, a cylindrical ham of 300 mm in circumference and 200 mm in length was inserted and vacuum-packaged, followed by 10 min. of boiling in hot water at 90° C.

A: A sealing bar was aligned with portion to be sealed of superposed films, and the bag making was stably performed at a film velocity at 30 m/min. while causing little shrinkage along the sealed portion.

B: A deviation occurred between a position of a sealing bar and a portion to be sealed of superposed films. As a result, stable bag making could not be performed at a film speed of 30 m/min. due to shrinkage along the sealed portion while the bag making was possible at a film speed of 10 m/sec.

5. Tray Packaging Performance

A pinch portion of product tubular film as obtained in a production example was cut off by slitting to form a 450 mm-wide flat film. Polystyrene-made trays each located with raw meat were subjected to gas-substitution packaging at a rate of 35 shots/min. while blowing in a mixture of 80% by volume of carbon dioxide and 20% by volume of oxygen as the substitution gas by using a flow packaging machine "Delta 2000", available from Dapack Co.). The packaging was performed at a room rate of 20% with respect to the tray. Then, the packaging was introduced into a shrink tunnel (available from Meurer Co.) to be shrinked therein while blowing air at 170° C. for 6 sec.

A: No tray deformation was observed after passing through the shrink tunnel, whereby a packaged product showing a beautiful appearance was obtained.

B: Some tray deformation was observed after passing through the shrink tunnel.

C1: A remarkable tray deformation was observed after passing through the shrink tunnel, thus providing a packaged product having a problematic appearance.

C2: The film failed to fit the tray due to insufficient shrinkage, thereby providing a packaged product having a problematic appearance.

6. Pizza Packaging Performance

A product tubular film as obtained in a production example was slit open along its pinch line to form a 750 mm-wide flat film. The flat film was used for gas-substitution packaging of uncooked pizza in a shape of 300 mm in diameter and 10 mm in height and placed on a polystyrene foam plate at a rate of 35 shots/min while blowing in carbonate gas by using a flow packaging machine "Delta 2000", available from Dapack Co.). The resultant package bag had sizes of 380 mm in length and 360 mm in width. The package bags were passed through a shrink tunnel (available from Meurer Co.) to shrink therein while blowing air at 200° C.

A: The packaged pizza after passing the shrink tunnel exhibited no warping, thus showing good appearance.

B: The packaged pizza after passing the shrink tunnel caused warping, thus seriously damaging the merchandise value.

7. Lidding Performance (Adaptability as a Tray Lid Material)

A product tubular film as obtained in a production example was slit open along its pinch line to form a 840 mm-wide flat film. The flat film was used as a lidding film for lidding of trays each having a laminar structure from the inner to outer sides of polyethylene (20 $\mu$m)/adhesive resin/EVOH (saponified ethylene-vinyl acetate copolymer) (7 $\mu$m)/adhesive resin/polystyrene foam (300 $\mu$m) and sizes of 225 mm (length)×155 mm (width)×40 mm (height), so that the flat film covered with its inner side surface the upper (inner) polyethylene side surface of each tray by using a performed tray machine "INPACK NEMA 4", available from Ross Co.) under the conditions of a sealing temperature of 110° C. and a rate of 20 shots (packs)/min. The thus obtained packaged trays were evaluated according to the following standard.

A: In the product which was left for one day after the packaging, no loosening of the lidding film or deformation of the tray was observed whereby the package exhibited a beautiful appearance.

C: In the product one day after the packaging, no loosening of the film was observed, but the tray was deformed to lower the merchandise value.

TABLE 1

Component Resins and Additives

| Abbreviation | Resin/additive* | Maker (Trade name) | Crystal melting point (° C.) | Remarks** |
|---|---|---|---|---|
| Ny-1 | nylon 6/66 copolymer | Mistubishi Enginneing Plastic K.K. (NOVAMID 2340A1) | 195 | $7_{rel}$ = 4.5 |
| Ny-2 | nylon 6/66 copolymer | Ube Kosan K.K. (UBE NYLON 5034B) | 193 | $7_{rel}$ = 4.4 |
| Ny-3 | nylon 6/12 coplymer | Toray K.K. (AMILAN CM 6541X3) | 133 | $7_{rel}$ = 2.7 |
| Ny-4 | nylon 66/610/MXD 6 copolymer | EMS K.K. (MULTI-POLYAMID BM18SBH) | 181 | — |

TABLE 1-continued

Component Resins and Additives

| Abbreviation | Resin/additive* | Maker (Trade name) | Crystal melting point (°C.) | Remarks** |
|---|---|---|---|---|
| PET | ethylene terephthalate copolyester *1 | Kanebo K.K. (BELBET IFG-8L) | 228 | $\eta_{int} = 0.80$ |
| PET-2 | ethylene terephthalate copolyester 2* | Eastman Kodak Co. (KODAPAK PET 9921) | 234 | $\eta_{int} = 0.80$ |
| EVOH | saponified ethylene-vinyl acetate copolymer | Kurary K.K. (EVAL EPG156B) | 160 | MFR = 6.5 g/10 min. |
| VL-1 | ethylene-butene-1 copolymer (d = 0.905 g/cm³) | Sumitomo Kagaku K.K. (SMIKASEN CN2011) | 107 | MFR = 4.0 g/10 min. |
| VL-2 | ethylene-hexene copolymer (d = 0.908 g/cm³) | Sumitomo Kagaku K.K. (SMIKASEN CS3009 | 119 | MFR = 3.0 g/10 min. |
| VL-3 | ethylene-octene copolymer (d = 0.902 g/cm³) | DSM (TEAMEX 1000F) | 124 | MFR = 3.0 g/10 min. |
| SVL-1 | ethylene-octene copolymer*3 (d = 0.910 g/cm³) | Dow Chemical Co. (AFFINITY PL1845) | 106 | MFR = 3.5 g/10 min. |
| SVL-2 | ethylene-octene copolymer*3 (d = 0.895 g/cm³) | Dow Chemical Co. (AFFINITY PF1140) | 94 | MFR = 1.6 g/10 min. |
| SLL | ethylene-octene copolymer *3 (d = 0.916 g/cm³) | Dow chemical Co. (ELITE 5400) | 122 | MFR = 1.2 g/10 min. |
| M-PE | modified very low density polyethylene *4 | Mitsui Kagaku K.K. (ADMER SF730) | — | MFR = 2.7 g/10 min. |
| TPU | thermoplastic polyurethane *5 | Kuraray K.K. (KURAMILON U1195E) | — | — |
| LUB-1 | lubricant master batch *6 | Nippon Pigment K.K. (NIPPISUN COLOUR MB60) | — | — |
| LUB-2 | lubricant master batch *7 | Sumitomo Kagaku K.K. (SMIASEN A-26) | — | MFR = 2.0 g/10 min. |
| AF | anti-fog additive *8 | Riken Vitamin K.K. (KP-410) | — | — |

*1: Acid is a mixture of 12 mol. % of isophthalic acid and 88 mol. % of terephthalic acid.
*2: Copolyester between terephthalic acid and diols of ethylene glycol & 1,4-cyclohexanedimethanol.
*3: Polymerized in the presence of a metallocene catalyst.
*4: Modified with an unsaturated carboxylic acid.
*5: Nitrogen content = 4.1%, d (density) = 1.21 g/cm³.
*6: Polyethylene terephthalate (base resin) containing 2.5 wt. % of silica.
*7: Polyethylene (base resin) containing 4% of aluminosilicate and 2% of elucic acid amide.
*8: Linear very low-density polyethylene (base resin) containing 8 wt. % of diglyceryl laurate/higher alcohol ethylene oxide ether (4.5/3.5) mixture.
**: $\eta_{rel}$ = relative viscosity (JIS-K6810), $\eta_{int}$ = intrinsic viscosity, MFR = melt flow rate.

TABLE 2

Film structure and Film-forming conditions

| Ex. & Comp. Ex. | Laminated layers (thickness) | | | | | | Total thickness (μm) | Film-forming condition | | | Film lay-flat width (mm) |
|---|---|---|---|---|---|---|---|---|---|---|---|
| | 1st (μm) | 2nd (μm) | 3rd (μm) | 4th (μm) | 5th (μm) | 6th (μm) | | Heat temp. (°C.) | Stretch ratio MD | TD | |
| Ex. 1–3 C. Ex. 1 | PET + LUB-1 *1 (2) | M-PE (1.5) | Ny-1 (7) | EVOH (5) | M-PE (1.5) | VL-2 + LUB-2 *3 (24) | 41 | 92 | 3.1 | 3.2 | 362 |
| Ex. 4–11 C. Ex. 2–3 | PET + LUB-1 *2 (1.5) | M-PE (1.5) | Ny-1 (8) | EVOH (5) | M-PE (1.5) | VL-1 + LUB-2 *3 (19) | 36.5 | 92 | 2.9 | 3.1 | 362 |

TABLE 2-continued

Film structure and Film-forming conditions

| Ex. & Comp. Ex. | Laminated layers (thickness) | | | | | | Total thickness (μm) | Film-forming condition | | | Film lay-flat width (mm) |
|---|---|---|---|---|---|---|---|---|---|---|---|
| | 1st (μm) | 2nd (μm) | 3rd (μm) | 4th (μm) | 5th (μm) | 6th (μm) | | Heat temp. (°C.) | Stretch ratio | | |
| | | | | | | | | | MD | TD | |
| Ex. 12–15 C. Ex. 4–5 | PET + LUB-1 *1 (1) | M-PE (1) | Ny-1 (5) | EVOH (3) | M-PE (1) | VL-2 + AF *4 (13) | 24 | 92 | 2.9 | 3.1 | 515 |
| Ex. 16 | PET + LUB-1 *1 (1.5) | M-PE (1) | Ny-1 (7) | EVOH (4) | M-PE (1) | VL-2 + AF *4 (16) | 30.5 | 92 | 2.9 | 3.1 | 515 |
| Ex. 17 C. Ex. 6 | PET + LUB-1 *1 (1.5) | M-PE (1.5) | Ny-1 + Ny-3 (50% + 50%) (8) | EVOH (5) | M-PE (1.5) | VL-1 + LUB-2 *3 (19) | 36.5 | 92 | 3.0 | 2.9 | 515 |
| Ex. 18 C. Ex. 7 | PET + LUB-1 *1 (2) | M-PE (1.5) | Ny-1 + Ny-4 (70% + 30%) (7) | EVOH (5) | M-PE (1.5) | VL-2 + LUB-2 *3 (22) | 39 | 87 | 3.0 | 3.4 | 515 |
| Ex. 19 C. Ex. 8 | PET + LUB-1 *1 (3) | M-PE (2) | Ny-1 (15) | M-PE (2) | VL-1 + LUB-2 *3 (42) | — | 64 | 92 | 2.9 | 3.1 | 362 |
| Ex. 20 | PET + LUB-1 *1 (4) | M-PE (2) | Ny-1 (25) | M-PE (2) | SLL (25) | — | 58 | 92 | 2.9 | 3.1 | 362 |
| Ex. 21 | PET + LUB-1 *1 (4) | M-PE (1.5) | Ny-1 (20) | EVOH (3) | M-PE (1.5) | SLL (50) | 80 | 92 | 2.6 | 2.9 | 412 |
| Ex. 22 | PET-2 (2) | M-PE (1.5) | Ny-2 (8) | EVOH (5) | M-PE (1.5) | VL-3 + LUB-2 *3 (21) | 39 | 92 | 3.1 | 3.2 | 335 |
| C. Ex. 9–11 | PET + LUB-1 *1 (4) | M-PE (3) | Ny-1 (17) | M-PE (3) | VL-1 + LUB-2 *3 (27) | — | 54 | 92 | 2.3 | 2.5 | 515 |
| C. Ex. 11–12 | PET + LUB-1 *1 (4) | M-PE (2) | Ny-1 (12) | EVOH (6) | M-PE (2) | VL-1 + LUB-2 *3 (19) | 45 | 92 | 2.3 | 2.5 | 515 |

*1: PET:LUB-1 = 98:2 (wt.)
*2: PET:TPU:LUB-1 = 88:10:2 (wt.)
*3: VL-1:LUB-2 = 97:3 (wt.), VL-2:LUB-2 = 97:3 (wt.), LV-3:LUB-2 = 97:3 (wt.).
*4: VL-2:AF = 90:10 (wt.)

TABLE 3

Heat-treating conditions & Performance evaluation (1)

| | Ex. 1 | Ex. 2 | Ex. 3 | Comp. Ex. 1 | Ex. 4 | Ex. 5 | Ex. 6 |
|---|---|---|---|---|---|---|---|
| Treating temp. (°C.) | 70 | 80 | 70 | N.T.* | 70 | 70 | 70 |
| Relaxation rate (%) MD/TD | 5/5 | 5/5 | 10/10 | — | 5/5 | 5/10 | 10/10 |
| Heat-shrinkage stress (MPa) 40° C. | 1.2/0.3 | 0.5/0.2 | 0.3/0.3 | 2.6/3.3 | 2.1/1.4 | 1.0/0.2 | 1.0/0.6 |
| Heat-shrinkage stress (MPa) 50° C. | 2.3/2.0 | 1.8/0.7 | 0.9/1.1 | 3.3/3.1 | 2.7/2.6 | 1.8/1.1 | 1.5/1.5 |
| Hot-water shrinkability (%) MD/TD 90° C. | 32/35 | 27/32 | 27/33 | 33/36 | 28/33 | 28/32 | 27/31 |
| Dry heat shrinkability (%) MD/TD 120° C. | 20/22 | 17/19 | 16/18 | 22/24 | 21/23 | 20/21 | 17/18 |
| Dry heat shrinkability (%) MD/TD 160° C. | 25/27 | 20/22 | 20/22 | 28/30 | 25/26 | 24/23 | 21/22 |
| Flow packaging | A | A | A | B | A | A | A |
| Boil test | A | A | A | C1 | A | A | A |
| Printability | A | A | A | C | A | A | A |
| Skin packaging | A | A | A | C1 | A | A | A |

*N.T. = Not treated.

TABLE 4

Heat-treating conditions & Performance evaluation (2)

| | Ex. 7 | Ex. 8 | Ex. 9 | Ex. 10 | Ex. 11 | Comp. Ex. 2 | Comp. Ex. 3 |
|---|---|---|---|---|---|---|---|
| Treating temp. (° C.) | 70 | 70 | 60 | 80 | 90 | N.T.* | 70 |
| Relaxation rate (%) MD/TD | 10/15 | 15/15 | 5/10 | 5/10 | 5/10 | — | 0/0 |
| Heat-shrinkage stress (MPa) 40° C. | 0.6/0.1 | 0.8/0.3 | 1.4/1.1 | 0.7/0.2 | 0.7/0.3 | 2.7/3.9 | 2.5/3.0 |
| Heat-shrinkage stress (MPa) 50° C. | 1.2/0.7 | 1.1/1.1 | 2.1/2.2 | 2.0/0.5 | 2.2/0.7 | 3.2/4.7 | 3.1/4.7 |
| Hot-water shrinkability (%) MD/TD 90° C. | 27/31 | 25/32 | 30/33 | 27/33 | 25/26 | 31/36 | 30/34 |
| Dry heat shrinkability (%) MD/TD 120° C. | —/— | —/— | —/— | —/— | —/— | 23/24 | 22/22 |
| Dry heat shrinkability (%) MD/TD 160° C. | —/— | —/— | —/— | —/— | —/— | 28/29 | 26/27 |
| Flow packaging | A | A | A | A | A | B | B |
| Boil test | A | A | A | A | A | C1 | B |
| Printability | A | A | A | A | A | C | B |
| Skin packaging | — | — | — | — | — | C1 | B |

*N.T. = Not treated.

TABLE 5

Heat-treating conditions & Performance evaluation (3)

| | Ex. 12 | Ex. 13 | Ex. 14 | Ex. 15 | Ex. 16 | Comp. Ex. 4 | Comp. Ex. 5 |
|---|---|---|---|---|---|---|---|
| Treating temp. (° C.) | 70 | 70 | 65 | 60 | 70 | N.T.* | 60 |
| Relaxation rate (%) MD/TD | 5/5 | 10/10 | 5/5 | 5/10 | 10/10 | — | 5/5 |
| Heat-shrinkage stress (MPa) 40° C. | 1.2/1.5 | 1.1/0.6 | 1.3/0.6 | 1.9/1.3 | 0.6/0.2 | 3.0/4.4 | 2.9/2.5 |
| Heat-shrinkage stress (MPa) 50° C. | 2.0/2.6 | 1.8/1.3 | 2.5/1.8 | 2.4/1.9 | 1.3/0.7 | 3.4/5.0 | 3.4/3.2 |
| Hot-water shrinkability (%) MD/TD 90° C. | 31/34 | 28/31 | 37/36 | 33/33 | 28/32 | 32/35 | 33/35 |
| Dry heat shrinkability (%) MD/TD 120° C. | 22/25 | 17/20 | 20/23 | 23/22 | 14/19 | 24/27 | 22/25 |
| Dry heat shrinkability (%) MD/TD 160° C. | 26/29 | 21/23 | 25/28 | 26/26 | 20/23 | 30/33 | 26/29 |
| Flow packaging | A | A | A | A | A | B | A |
| Tray packaging | A | A | A | A | A | C1 | B |
| Printability | A | A | A | B | A | C | B |
| Skin packaging | A | A | A | — | — | — | — |
| Lidding | A | A | A | A | A | C | C |
| Pizza packaging | A | A | A | A | A | C | C |

*N.T. = Not treated.

TABLE 6

Heat-treating conditions & Performance evaluation (4)

| | Ex. 17 | Comp. Ex. 6 | Ex. 18 | Comp. Ex. 7 | Ex. 19 | Comp. Ex. 8 | Ex. 20 |
|---|---|---|---|---|---|---|---|
| Treating temp. (° C.) | 70 | N.T.* | 70 | N.T.* | 70 | N.T.* | 70 |
| Relaxation rate (%) MD/TD | 5/5 | — | 5/5 | — | 5/15 | — | 5/15 |
| Heat-shrinkage stress (MPa) 40° C. | 1.4/0.4 | 2.3/2.2 | 1.5/0.9 | 3.1/3.0 | 0.2/0.2 | 1.7/2.7 | 0.8/0.2 |
| Heat-shrinkage stress (MPa) 50° C. | 2.7/1.6 | 3.3/3.1 | 2.7/2.0 | 3.4/3.5 | 0.6/0.5 | 3.1/3.9 | 0.7/1.2 |
| Hot-water shrinkability (%) MD/TD 90° C. | 36/39 | 39/42 | 39/40 | 42/43 | 26/22 | 29/32 | 24/26 |
| Flow packaging | A | B | A | B | — | — | — |
| Boil test | A | B | A | B | A | B | A |
| Tray packaging | A | B | A | B | — | — | — |
| Printability | A | C | A | C | A | C | A |

*N.T. = Not treated.

TABLE 7

Heat-treating conditions & Performance evaluation (5)

| | Ex. 21 | Ex. 22 | Comp. Ex. 9 | Comp. Ex. 10 | Comp. Ex. 11 | Comp. EX. 12 |
|---|---|---|---|---|---|---|
| Treating temp. (° C.) | 70 | 70 | 70 | N.T.* | 70 | N.T.* |
| Relaxation rate (%) MD/TD | 10/10 | 5/5 | 10/10 | — | 10/10 | — |
| Heat-shrink-age 40° C. | 0.1/0.2 | 1.4/1.3 | 0.1/0.2 | 1.4/2.5 | 0.1/0.2 | 0.8/2.0 |
| stress 50° C. (MPa) | 0.3/0.5 | 2.1/2.6 | 0.4/0.5 | 2.6/3.4 | 0.4/0.6 | 3.2/3.8 |
| Hot-water shrinkability (%) MD/TD 90° C. | 22/25 | 28/34 | 18/19 | 25/28 | 17/18 | 24/26 |
| Boil test | A | A | C2 | A | C2 | A |
| Tray packaging | — | — | C2 | — | C2 | — |
| Printability | A | A | A | C | A | C |
| Skin packaging | — | — | C2 | — | C2 | — |

*N.T. = Not treated.

INDUSTRIAL APPLICABILITY

As described above, the present invention provides a heat-shrinkable multilayer film, which prevents the occurrence of an excessively large heat-shrinkage stress while ensuring a necessary level of heat-shrinkability, thus exhibiting excellent adaptability to various automatic packaging processes and also good printability.

What is claimed is:

1. A heat-shrinkable multilayer film, comprising at least three layers including an outer surface layer (a) comprising a polyester resin, an intermediate layer (b) comprising a polyamide resin, and an inner surface layer (c) comprising a sealable resin; said multilayer film exhibiting a heat-shrinkage stress at 50° C. of at most 3 MPa both in longitudinal direction and in transverse direction, and a hot water shrinkability at 90° C. of at least 20%.

2. A heat-shrinkable multilayer film according to claim 1, wherein the outer surface layer (a) has a smaller thickness than the intermediate layer (b).

3. A heat-shrinkable multilayer film according to claim 1, further including an intermediate layer (d) comprising a gas-barrier resin between the outer surface layer (a) and the inner surface layer (c).

4. A heat-shrinkable multilayer film according to claim 1, wherein the polyester resin of the outer surface layer (a) comprises a polyester derived from terephthalic acid and a diol having at most 10 carbon atoms.

5. A heat-shrinkable multi-layer film according to claim 1, wherein the polyester resin of the outer surface layer (a) comprises a copolyester derived from ethylene glycol and a dicarboxylic acid mixture comprising a major amount of terephthalic acid and a minor amount of isophthalic acid.

6. A heat-shrinkable multi-layer film according to claim 1, wherein the polyester resin of the outer surface layer (a) comprises a copolyester derived from terephthalic acid and a diol mixture comprising a major amount of ethylene glycol and a minor amount of 1,4-cyclohexanedimethanol.

7. A heat-shrinkable multilayer film according to claim 1, wherein the polyamide resin of the intermediate layer (b) comprises an aliphatic copolyamide.

8. A heat-shrinkable multilayer film according to claim 1, wherein the sealable resin of the inner surface layer (c) comprises an ethylene copolymer or an acid-modified product of the ethylene copolymer.

9. A heat-shrinkable multilayer film according to claim 8, wherein the ethylene copolymer comprises a copolymer of a major amount of ethylene with a minor amount of a vinyl monomer selected from the group consisting of α-olefins, unsaturated carboxylic acids, and unsaturated esters of carboxylic acids.

10. A heat-shrinkable multilayer film according to claim 1, wherein the sealable resin comprises a resin selected from the group consisting of metallocene-catalyzed linear low-density polyethylene, metallocene-catalyzed very low-density polyethylene, linear low-density polyethylene, linear very low-density polyethylene, ethylene-vinyl acetate copolymer, ethylene-methacrylic acid copolymer, ethylene-methacrylic acid-unsaturated carboxylic acid copolymer, and ionomer resins.

11. A heat-shrinkable multilayer film according to claim 3, wherein the gas-barrier resin comprises saponified ethylene-vinyl acetate copolymer.

12. A heat-shrinkable multilayer film according to claim 1, further including an intermediate layer comprising a copolymer of ethylene with an oxygen-containing vinyl monomer between the outer surface layer (a) and the inner surface layer (c).

13. A heat-shrinkable multilayer film according to claim 1, further exhibiting a dry heat-shrinkability at 120° C. of at least 15%.

14. A heat-shrinkable multilayer film according to claim 1, further having a printed pattern on the outer surface layer (a).

15. A process for producing a heat-shrinkable multilayer film according to claim 1, comprising the steps of:
   co-extruding at least three species of melted thermoplastic resins to form a tubular product comprising at least three layers including an outer surface layer (a) comprising a polyester resin, an intermediate layer (b) comprising a polyamide resin and an inner surface layer (c) comprising a sealable resin,
   cooling with water the tubular product to a temperature below a lowest one of the melting points of the polyester resin, the polyamide resin and the sealable resin constituting the layers (a), (b) and (c),
   re-heating the tubular product to a temperature which is at most the lowest one of the melting points of the polyester resin, the polyamide resin and the sealable resin constituting the layers (a), (b) and (c),
   vertically pulling the tubular product while introducing a fluid into the tubular product to stretch the tubular product a ratio of 2.5–4 times both in a vertical direction and in a circumferential direction, thereby providing a biaxially stretched tubular film,
   folding the tubular film,
   again introducing a fluid into the folded tubular film to form a tubular film,
   heat-treating the tubular film from its outer surface layer (a) with steam or warm water at 60–98° C., and
   cooling the heat-treated tubular film to provide a biaxially stretched film exhibiting a heat-shrinkage stress at 50° C. of at most 3 Mpa both in longitudinal direction and transverse direction, and a hot water shrinkability at 90° C. of at least 20%,
   to thereby obtain the heat-shrinkable multilayer film according to claim 1.

16. A blown plastic container comprising a multilayer film according to any one of claims 1–14 in a blown tubular form.

17. A packaged product, comprising a multilayer film according to claim 1, and a content material packaged with the multilayer film in a heat-shrinked state.

18. A packaged product according to claim 17, having a printed pattern on the outer surface layer (a).

19. A packaged product according to claim 17, wherein the multilayer film has been heat-shrinked with hot water.

20. A packaged product according to claim 17, wherein the multilayer film has been heat-shrinked with hot gas.

21. A packaged product according to claim 17, wherein content material has been skin-packaged by covering the content material placed on a base film with the multilayer film, and heat-sealing the multilayer film to the base film at a marginal portion of the multilayer film and the base film where the content material is absent.

22. A packaged product according to claim 17, wherein the content material has been flow-packaged by inserting the content material into a flow packaging material formed of the multilayer film and heat-sealing marginal portions of the multilayer film to each other.

23. A packaged product according to claim 17, wherein the content material has been tray-packaged by wrapping the content material placed on a tray with the multilayer film, and heat-shrinking the multilayer film.

24. A packaged product according to claim 17, wherein the content material has been tray-packaged by placing the content material on a resinous tray having a peripheral marginal portion where the content material is absent, covering the content material with the multilayer film, and heat-sealing the multilayer film to the marginal portion of the resinous tray.

25. A packaged product according to claim 17, wherein the content material comprises food.

26. A packaged product according to claim 25, wherein the food comprises meat.

27. A packaged product according to claim 25, wherein the food comprises pizza.

* * * * *